Jan. 24, 1967     M. R. LEE ETAL     3,300,754
METHOD FOR PRODUCING IMPEDANCE LOGS USING
SEISMOGRAPHIC TECHNIQUES
Filed Nov. 20, 1963     6 Sheets-Sheet 2
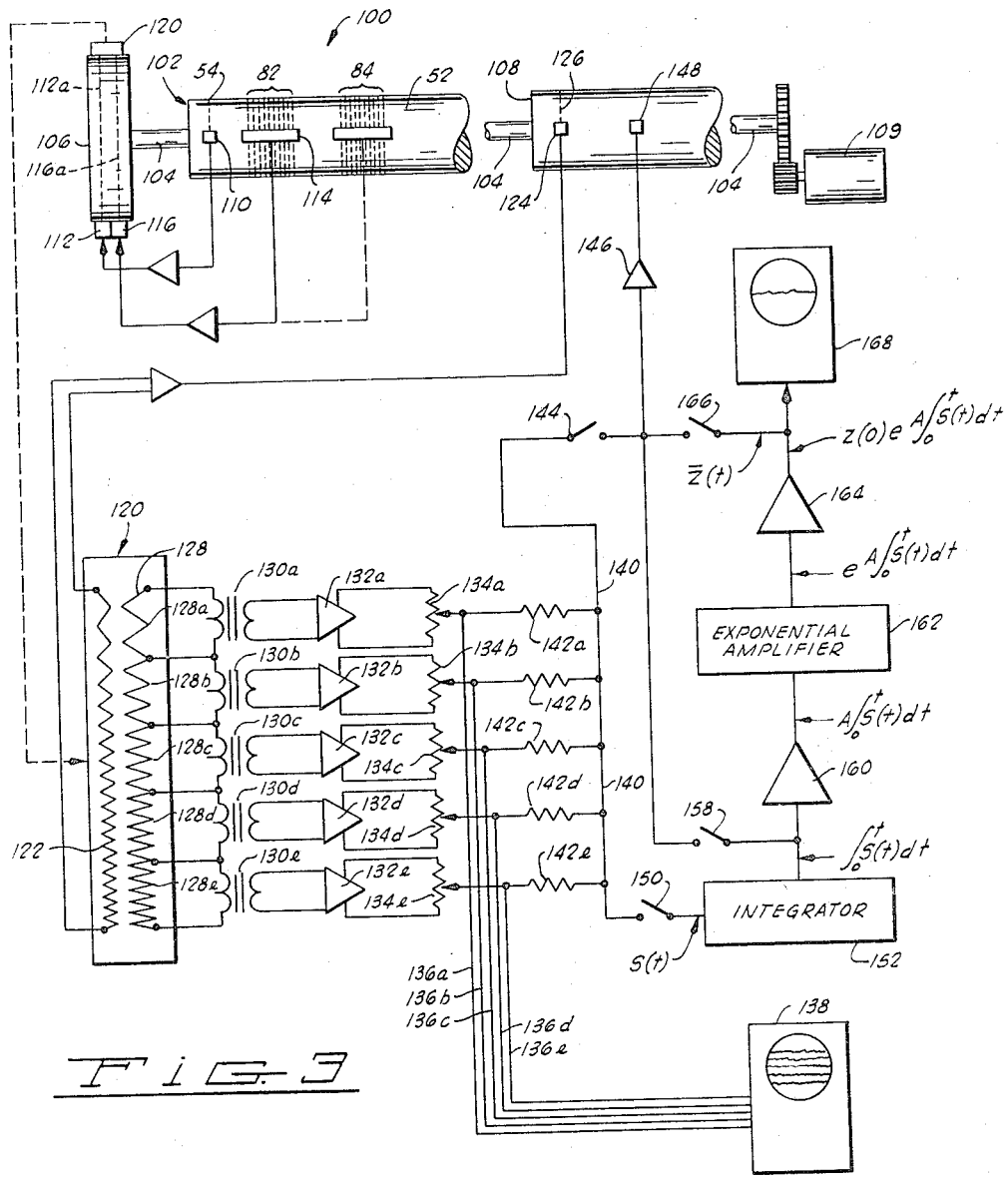
Fig. 3
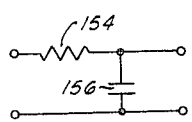
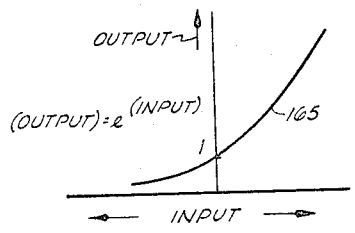
Fig. 5  Fig. 4
INVENTORS
MILFORD R. LEE,
KENNETH H. WATERS &
BY     BILLY J. HEATH
William J. Miller
ATTORNEY

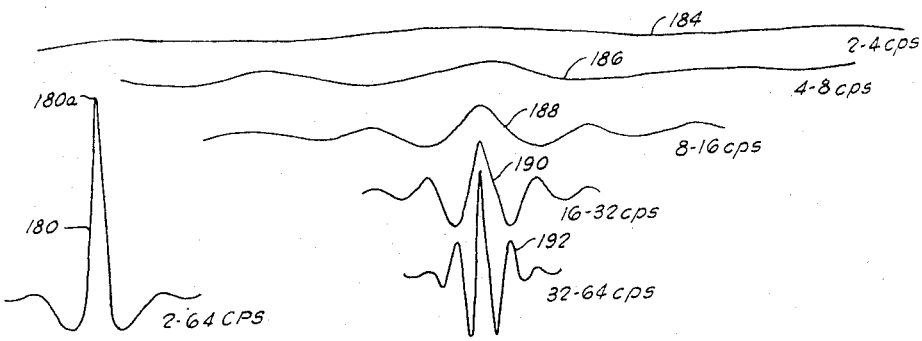
FIG. 10   FIG. 11
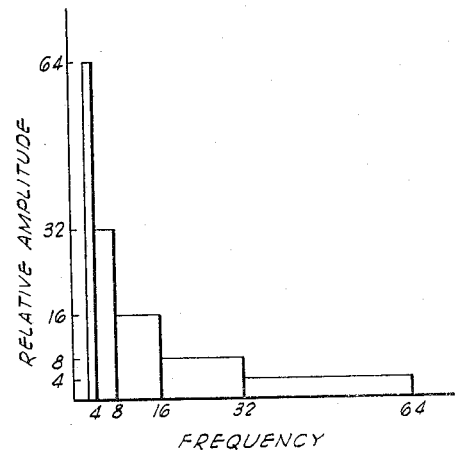
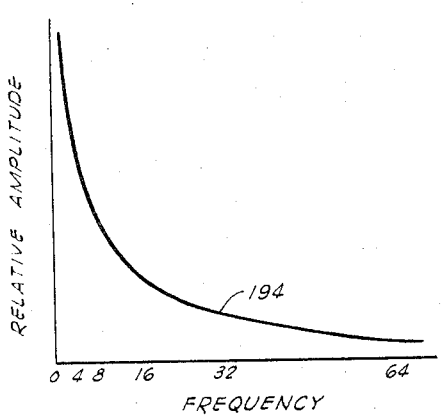
FIG. 13   FIG. 12
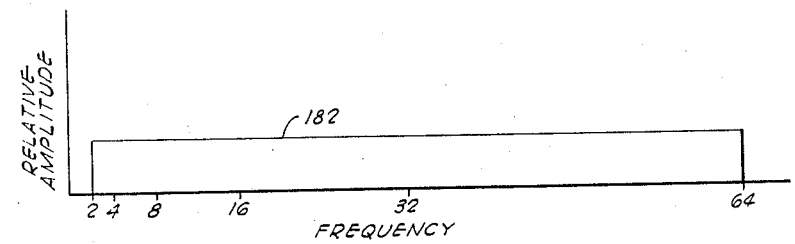
FIG. 14
INVENTORS
MILFORD R. LEE,
KENNETH H. WATERS &
BILLY J. HEATH
BY
ATTORNEY

INVENTORS
MILFORD R. LEE,
KENNETH H. WATERS &
BILLY J. HEATH
BY
ATTORNEY

United States Patent Office 3,300,754
Patented Jan. 24, 1967

3,300,754
METHOD FOR PRODUCING IMPEDANCE LOGS USING SEISMOGRAPHIC TECHNIQUES
Milford R. Lee, Kenneth H. Waters, and Billy J. Heath, all of Ponca City, Okla., assignors to Continental Oil Company, Ponca City, Okla., a corporation of Delaware
Filed Nov. 20, 1963, Ser. No. 325,017
13 Claims. (Cl. 340—15.5)

The present invention relates to seismographic surveying, and more particularly, but not by way of limitation, relates to an improved method for determining lithological geometry using only equipment located at the surface of the earth, and still more particularly, relates to a method for producing an approximate seismic energy impedance log using seismographic techniques. The seismic impedance log referred to consists of a display of the product of the density and the seismic velocity as a function of depth.

In conventional seismographic surveying a seismic impulse is generated at or near the surface of the earth and propagates downwardly through the various lithological formations. Portions of the seismic impulse are reflected to the surface by interfaces between layers or beds of differing seismic energy velocity characteristics. These reflections are detected at the surface and recorded against elapsed time to produce what is known generally in the art as a seismogram. The seismogram provides, basically, the two-way travel time required for the seismic energy to propagate downwardly to the various interfaces and be reflected back to the surface. From this information the general location of the reflecting interfaces can be determined. However, a conventional seismogram is somewhat difficult to interpret, even by those most skilled in the art, because very little information about the character and thickness of many of the subterranean beds is revealed and identification of the beds is often difficult.

It has long been recognized that the reflected seismic information is in some way related to the spacing between the various interfaces and therefore is related to the thickness of the various beds. For example, it has been known that the minimum bed thickness which can be detected by seismographic techniques is dependent upon the highest frequency component of the seismic energy induced in the earth. In general, two like interfaces will produce a reinforced seismic reflection in response to seismic energy having a wave length related to the distance between the interfaces. Explosives, the more conventional source of seismic energy, produce an energy impulse whose frequency components have unpredictable and non-repeatable amplitudes.

More recently, seismographic methods for determining the two-way travel times of seismic energy have been developed which employ a non-repetitive seismic signal of known frequency band width, known frequency content, and known phase orientation of the frequency components. The seismic signal conventionally has a continuously varying frequency between upper and lower limits to produce what is referred to by workers in the art as a sweep signal, either an upsweep or a downsweep. The seismic sweep signal is generated by a transducer which is capable of accurately reproducing the same signal under substantially any conditions. Various compositing techniques involving the sequential generation of the same signal at different points on the earth and the recordation of the reflections at predetermined spaced points have been developed for reducing interference noise and, in effect, amplifying the sweep signal reflections. The composited signal is then correlated against the original sweep signal to produce an impulse equivalent seismogram from which the two-way travel time of the seismic energy to the identifiable "seismic events" can be determined. This general method is described in its various aspects in U.S. Patents Nos. 2,688,124, 2,989,726, 2,808,577, 2,874,795, 2,981,928, and others, all of which are assigned to the assignee of the present invention.

As previously mentioned, a seismogram normally provides only travel time data. It is generally recognized in the art that a so-called velocity log or impedance log is an ideal method of presenting subterranean data because it is directly related to the physical character and geometry of the beds. The conventional means for obtaining this velocity data has been a logging tool which is lowered into a well bore to measure the incremental acoustic velocities which are then plotted with respect to depth.

Some attempts have been made to convert conventional seismic data to impedance log type presentations. One such method uses explosively generated seismic signals which are processed by a so-called inverse filter based on the first received reflection signal to eliminate instrumentation effects and ultimately obtain an impedance log-type presentation which is said to be more susceptible to interpretation than the conventional seismic data; however, this and other attempts are believed to be impractical from an operational standpoint and are of questionable reliability.

The present invention, in its broader aspects, involves the production of a trace obtained by seismic reflection techniques in which the relative phases of a broad band of seismic energy frequency components are adjusted to zero and the relative amplitudes are adjusted until any given octave has substantially equal spectral power with any other related octave. When practicing the present invention, a seismic signal having a predetermined, controlled or known frequency content is used to produce a reflection record or seismogram. The seismogram is then correlated with the original seismic signal to produce an impulse equivalent or correlated signal in which all of the individual frequency components or wavelets of the original seismic signal are reoriented relative to a common phase point. The relative amplitudes of predetermined segments of the frequency spectrum, preferably of equal band width, are then adjusted to "normalize" the correlated signal and correct for attenuation (but not interaction) of the various frequencies of the seismic signal by the earth. Next the correlation signal, which constitutes a band width limited, spectrum normalized impulse seismogram, is converted to an approximate impedance log by integrating and exponentially amplifying the signal to produce a signal or trace which is a close approximation of a downhole seismic energy impedance log. We have discovered that the signal when only integrated also constitutes an approximate impedance log which is considerably more interpretable than a conventional seismogram, and which will be substantially as good as the exponentially amplified signal. We have also discovered that the broader the frequency band of the seismic signal, particularly at the lower end of the frequency spectrum, the closer the approximation to an exact impedance log.

Therefore, an object of the present invention is to provide an improved method for determining the geometry, and to some degree, the physical character of subsurface strata of the earth without mechanically penetrating the surface of the earth.

Another object of the invention is to provide an improved method for displaying seismographic data which is more easily interpreted and more informative.

Still another object of the invention is to provide a method for producing an approximate seismic energy impedance log of the earth using seismographic techniques.

Yet another object of the invention is to provide a more economical seismographic method of determining the lithological geometry of an area.

Another object of the invention is to provide a method of the type described which can be easily and economically practiced using analog electrical circuitry.

Still another object of the invention is to provide a method of the type described which requires considerably less seismographic data in order to determine the lithology of an area.

Many additional objects and advantages of the invention will be evident to those skilled in the art from the following detailed description and the appended drawings, wherein:

FIG. 3 is a schematic diagram of additional equipment which can be used to perform the other steps of the method of the present invention;

FIG. 4 is a schematic circuit diagram of an integrator circuit which may be used in the equipment of FIG. 3;

FIG. 5 is a curve illustrating the operation of the exponential amplifier which may be used in the equipment of FIG. 3;

FIGS. 10-14 are schematic drawings which will assist in explaining our theory of the present invention;

GENERAL AND THEORETICAL

Figure 1:
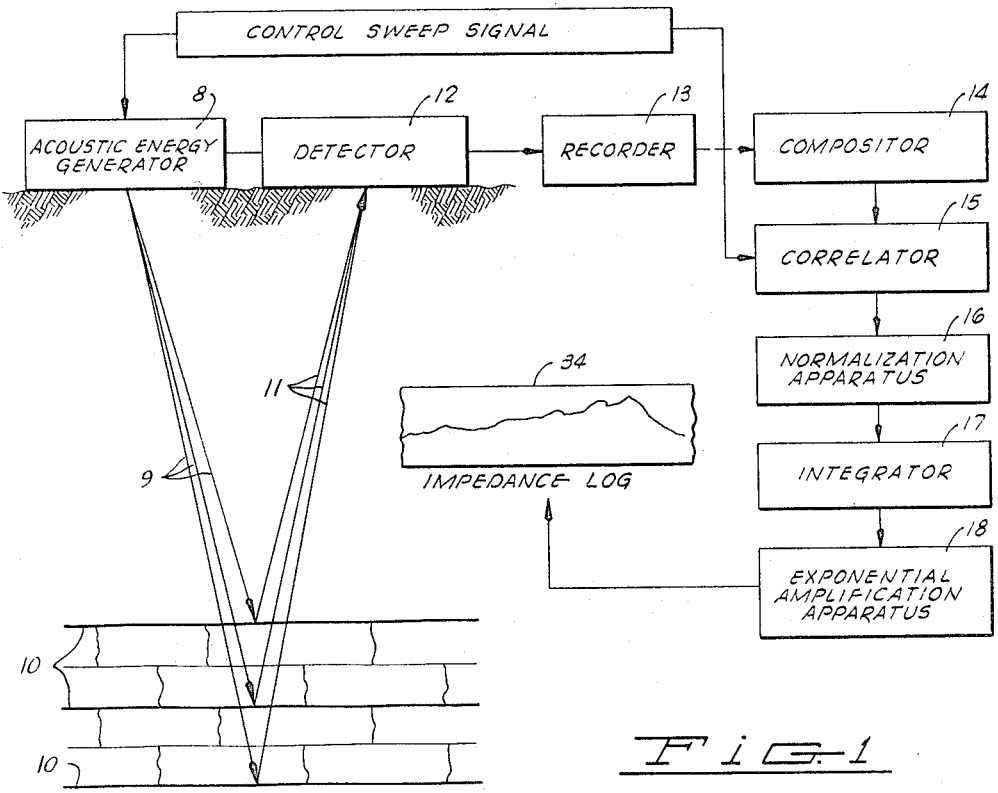
FIG. 1 is a schematic diagram illustrating in detail the steps of the method of the present invention.

The method of the present invention entails inducing a plurality of seismic energy frequency components in the earth in a predetermined or known relative phase relationship and detecting the seismic reflections of the frequency components. More specifically, seismic energy frequency components having a relatively wide band, flat amplitude total frequency spectrum are induced in the earth. The seismic energy reflections are detected and recorded with respect to elapsed time. The reflection record signal is processed to eliminate any relative phase differences between the original seismic energy frequency components, to eliminate any phase error induced by instrumentation, and to adjust for the 90° phase shift induced by the reflection process of the earth. The relative amplitudes of the components are adjusted until any given octave of frequency band width of the seismic energy has equal spectral power with any other related octave.

The seismic "events" of a conventional seismogram are composites of a plurality of reflections for the most part, and their net characteristics are greatly influenced by wave length considerations. Wave lengths are measured in feet, so somewhere in the composite reflection "events" is lithologic geometry information expressed in feet. Thus, many major reflections are in a sense tuned to some interface spacing or sequence of interface spacings. If there are any wave lengths in a downgoing seismic signal which possess the proper relationship to lithological interface separations, the earth system will pick out these particular wave lengths and return them selectively and preferentially as part of the signal which is detected at the surface. The reflection signals are therefore filtered in the sense that specific frequency enrichment has occurred, and the enrichment has occurred in a way which is directly relatable to lithologic geometry. Accordingly, a wide frequency band input seismic signal containing all possible wave lengths is preferred in order to obtain all possible values of interface spacings, and this is particularly true at the lower end of the frequency spectrum, as will hereafter be pointed out in greater detail.

The method of the present invention is confirmed and can be more easily understood by the following mathematical derivation. The reflection of seismic energy between two different rock formations having seismic energy impedances represented by Z and ΔZ is represented by the formula:

$$\Delta R = (Z + \Delta Z) - Z / (Z + \Delta Z) + Z \qquad (1)$$

where ΔZ is the variation of the reflection coefficient R. If the change of seismic energy impedance between the adjacent rock formations is small, Equation 1 can be reduced to:

$$\Delta R = \Delta Z / 2Z \qquad (2)$$

By using the standard tables of differentials, the following substitutions can be made in Equation 2:

$$\Delta R = \tfrac{1}{2} \Delta (\text{Log}_e Z) \qquad (3)$$

Thus it will be appreciated that the variation of the reflection coefficient is one-half the variation of the natural logarithm of the seismic energy impedance Z.

It is known that the seismic energy impedance of the earth changes in a smooth manner so that it may be represented by a continuous curve showing the seismic energy impedance plotted with respect to the travel time of a seismic wave in the earth. Of course, this smooth curve may be approximated by a number of steps at intervals of time Δt, and the approximation will become more precise as the time interval Δt becomes smaller. Thus, if each small reflection coefficient is taken through a small interval of time, which will correspond to a very short distance of depth, either a positive or negative reflection impulse will be produced for each increment of depth. The value or amplitude of the reflection impulse will also then be equal to the reflection coefficient caused by the change in seismic energy impedance across that depth. The reflectivity γ(t) at any time can therefore be defined as that value which, when multiplied by the time through which it acts, gives rise to the reflection coefficient. Therefore, $\gamma(t) \cdot \Delta t = \Delta R$, and upon substitution in Equation 3, the following equation is obtained:

$$\gamma(t) \Delta t = \tfrac{1}{2} \Delta [\text{Log}_e Z(t)] \qquad (4)$$

Equation 4 can be rewritten as:

$$\gamma(t) = \tfrac{1}{2} \frac{\Delta [\text{Log}_e Z(t)]}{\Delta t} \qquad (5)$$

As Δt becomes smaller and smaller in order to approximate the impedance log closer and closer, Equation 5 becomes:

$$\gamma(t) = \tfrac{1}{2} \frac{d [\text{Log}_e Z(t)]}{dt} \qquad (6)$$

The reflectivity γ(t) as defined by Equation 6 is the mathematical representation of a seismographic record which would be obtained if an infinite band width seismic impulse were induced in the earth and no multiple reflections or reverberations occurred. Thus it will be noted that such a seismic record is related to the seismic energy impedance variation Z(t).

Equation 6 can be inverted to obtain the impedance log in terms of the infinite band width seismic records in the following manner. First integrate both sides of the equation with respect to time to produce:

$$\int_0^t \gamma(t)dt = \int_0^t \tfrac{1}{2}\tfrac{d}{dt}[\text{Log}_e\, Z(t)]dt \qquad (7)$$

which can be reduced to $$\int_0^t \gamma(t)dt = \tfrac{1}{2}[\text{Log}_e\, Z(t) - \text{Log}_e\, Z(0)] \qquad (8)$$

and finally $$\int_0^t \gamma(t)dt = \tfrac{1}{2}\text{Log}_e\, \frac{Z(t)}{Z(0)} \qquad (9)$$

Taking the exponential of both sides of Equation 9 produces:

$$e^{2\int_0^t \gamma(t)dt} = \frac{Z(t)}{Z(0)} \qquad (10)$$

which can be written as $$Z(t) = Z(0)e^{2\int_0^t \gamma(t)dt} \qquad (11)$$

where $Z(t)$ is the impedance with respect to travel time of the seismic signal. Equation 11 is the basic formula for the process of obtaining an impedance log from a theoretically perfect seismogram $\gamma(t)$ obtained by inducing an infinite band width, equal or flat amplitude seismographic signal in the earth. Of course, it will be appreciated by those skilled in the art that an infinite band width seismic signal and consequently a seismogram from such a signal is not possible.

We have discovered that a very worthwhile approximation of an impedance log can be made by processing a finite band width, substantially flat amplitude spectrum, impulse-type seismic record represented by $S(t)$ in accordance with the equation:

$$\overline{Z}(t) = Z(0)e^{A\int_0^t s(t)dt} \qquad (12)$$

wherein $\overline{Z}(t)$ represents the approximate seismic energy (acoustic) impedance log as a function of seismic energy travel time, $Z(0)$ is a constant representing the seismic energy impedance at time zero, and A is an empirically determined constant. Thus it will be seen that the method of the present invention, in its broader aspects, entails producing the particular type of seismogram described and then processing the seismogram in such a manner as to produce an approximate solution for $\overline{Z}(t)$ in Equation 12. This entails, in its more exact solution, integrating the seismogram and then exponentially amplifying the integrated seismogram. The constants $Z(0)$ and A can be introduced as linear amplification factors on an empirical or "best fit" basis with available data. We have discovered, however, that a very good approximation of a solution to Equation 12 can be made merely by integrating special type of seismic data. This latter discovery was made by following an "equal representation by octaves concept." Having once made this discovery, the following reconciliation of this concept with empirically determined Equation 12 was made which confirms both propositions.

Making the assumption that the value of the integral $$A\int_0^t S(t)dt \qquad (13)$$

of Equation 12 is always much less than unity and is in fact so small that the square and higher powers may be neglected compared to the integral itself, and substituting, for simplicity, the letter X for the integral produces the equation $$\overline{Z}(t) = Z(0) \cdot e^X \qquad (14)$$

$e^X$ can be expanded into the well known power series $$e^X = 1 + X + \frac{X^2}{2} + \frac{X^3}{6} + \cdots \qquad (15)$$

Since it has been postulated that $X^2/2$ and higher order terms can be neglected in comparison with X, $$\overline{Z}(t) = Z(0)(1+X) \qquad (16)$$

and resubstituting for X gives $$\overline{Z}(t) = Z(0) + A_z(0)\int_0^t S(t)dt \qquad (17)$$

An interpretation of Equation 17 is that the value of an approximate impedance log at time $t$ is a constant $Z(0)$ plus an amplified integral of the special seismogram, down to time $t$. Since the primary interest lies in the variations in the value of the impedance with respect to travel time, the simplified form of the impedance log is just an amplified integration of the special seismic trace.

PREFERRED METHOD

One novel method of practicing the present invention is illustrated schematically in FIG. 1. A seismic sweep signal is induced in the earth in response to, and in synchronism with, a predetermined control sweep signal from a suitable source 8. The seismic energy propagates downwardly along a plurality of paths 9 to subterranean impedance interfaces 10 where a portion of the seismic energy is reflected back along a plurality of paths 11 to the surface of the earth where it is received by a detector 12 and applied to a recorder 13. This process is sequentially repeated a plurality of times with care being taken to maintain the proper zero time relationship between the sequentially recorded signals. The several signals are then applied to a compositor 14 which simultaneously reproduces and adds the sequentially recorded signals on recorder 13 to produce a composited signal. The composited signal is then applied to a correlator 15 with the control sweep signal to shift the phase of the various frequency components of the sweep signal to a comomn point in time, and to produce a correlation signal which is a two-way travel time seismogram. The seismogram is that which would be produced in response to an impulse of seismic energy having a predetermined, finite band width, and zero relative phase. The correlation signal is then applied to a normalizing apparatus 16 where amplitude adjustment is made to predetermined segments of the frequency spectrum in a manner to be later described. The normalized signal is then applied to an integrator 17 where the signal is integrated from zero time, or from a predetermined datum time, over its entire length. In most cases the resulting integration signal from integrator 17 will be a sufficiently accurate approximation of the impedance log that no further processing will be justified. However, for further refinement, the integration signal is exponentially amplified by exponential amplifier 18 (such as an Antilog, base $e$ amplifier manufactured by Electronic Associates, Inc. of Long Branch, New Jersey, using their Dual Log X Diode Function Generator), to produce an impedance log which is a relatively close approximation of a downhole velocity log.

Figure 2:
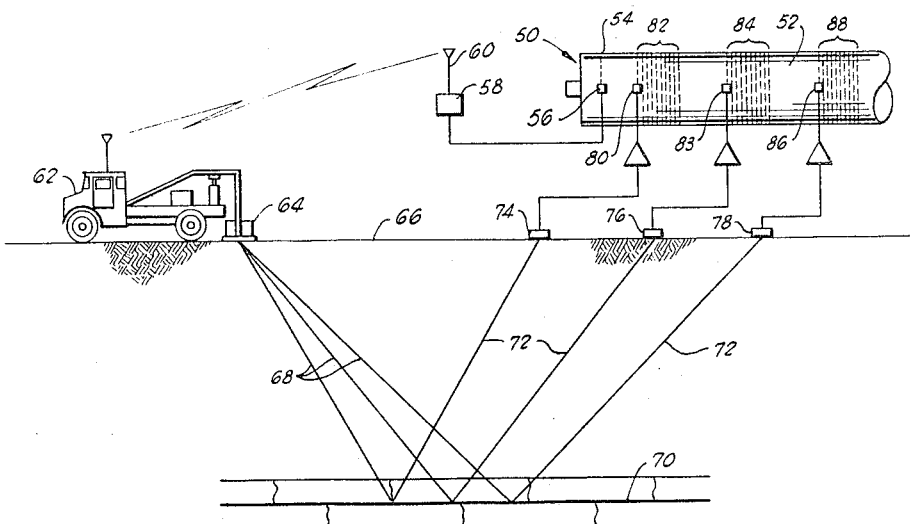
FIG. 2 is a schematic diagram of equipment which can be used to perform certain steps of the method of the present invention.

The method of the present invention described in FIG. 1 can be practiced using the equipment illustrated schematically in FIGS. 2 and 3. A magnetic recording device, indicated generally by the reference numeral 50, may conveniently be of the type disclosed in U.S. Patent No. 3,065,453, issued to W. E. N. Doty on November 20, 1962, entitled "Compositing Sequentially Produced Signals," and assigned to the assignee of the present invention. The recording device 50 has a rotating drum on which a suitable magnetic record sheet 52 is disposed. A non-repetitive sweep signal having a continuously varying frequency extending over a period of a few seconds is recorded on a record track 54 of record sheet 52. The sweep signal may conveniently be either an upsweep or downsweep between 6 and 65 c.p.s., for example. The sweep signal is reproduced by a pickup head 56 from record track 54 and is broadcast by a suitable radio transmitter 58 having an antenna 60. The control sweep signal is recieved by suitable circuit means in a truck 62 which carries a vibrating transducer 64.

In general, the transducer 64 comprises an earth coupling member which can be pressed against the surface 66 of the earth by the weight of the truck 62.

The seismic sweep signal generated by the transducer then propagates downwardly along paths 68, for example. Upon engaging an impedance interface 70, a portion of the seismic energy is reflected generally along paths 72 to suitable detector means, such as geophones 74, 76 and 78. The seismic reflection signal detected by geophone 74 is amplified and recorded by a recording head 80 on track 82 on the record sheet 52 of the drum. The seismic reflection signal detected by geophone 76 is similarly amplified and recorded by a recording head 83 on a track 84, and the seismic reflection signal detected by geophone 78 is recorded by a recording head 86 on a track 88. Reproduction of the control sweep signal from track 54; and hence operation of the transducer 64, are repeated a plurality of times to provide a series of reflected seismic signals. The record heads 80, 83 and 86 are indexed along the record sheet 52 between each reproduction of the sweep signal to provide a series of parallel tracks 82, 84 and 88 representing the respective reflected signals received by the geophones 74, 76 and 78 to facilitate the compositing of these signals as will be described. Also, the truck 62 may be moved between the various transmissions by the transducer 64 to improve the signal-to-noise ratio in the resulting composite signal as will be understood by those skilled in the art.

From the foregoing description, it will be appreciated that the control sweep signal recorded on track 54 serves as an initial starting point or zero time. Using this signal as a datum or reference, the location of the various impedance interfaces causing the recorded reflections along the path 68 can be determined by the elapsed time between the zero starting time and the time at which the reflections are recorded.

After the seismic data is compiled, the record sheet 52 is transferred to an apparatus 100 (see FIG. 3) which composites, correlates, normalizes, integrates, and exponentially amplifies the data. The record sheet 52 is placed on a reproducing drum 102 which is connected to a shaft 104. A correlation drum 106 and a recording drum 108 are also connected to shaft 104 which is driven by some suitable means indicated generally by reference numeral 109. A reproducing head 110 is positioned over the record track 54 for reproducing the original control sweep signal as the drum 102 is turned by the shaft 104. The reproduced control sweep signal is amplified and recorded by a recording head 112 on the record track 112a of the correlating drum 106. A single reproducing head 114 scans all of the record tracks 82 to simultaneously reproduce and add or composite the separate sets of seismic data. The reproduced and composited signal is then amplified and recorded by a recording head 116 on the record track 116a of the correlating drum 106.

An elongated correlation head 120 is comprised of a zero time pickup head 122 and a correlation pickup head 128 which are disposed adjacent the record tracks 112a and 116a, respectively. In general, these heads employ a printed circuit conductor having a configuration corresponding to the shape of the sweep signal and are suitably supported to extend circumferentially around a major portion of the drum 106 over the respective tracks 112a and 116a. The magnitude of the electrical signal generated in the respective heads is a measure of the degree of coherence between the sweep signal and the signal recorded on the respective record tracks 112a and 116a of the correlation drum 106. Therefore, when the sweep signal recorded on track 112a of the correlation drum 106 coincides with the zero time pickup head 122, an impulse will be generated which will then be amplified and recorded by the recording head 124 on record track 126 of recording drum 108. As the complex composited signal recorded on track 116a passes under the correlation pickup head 128, a correlation signal will be generated over the entire length of the head which will be in direct proportion to the degree of coherence between the sweep signal and the composite signal.

The transcription circuitry, the radio transmitter and receiver, the geophones and the amplifier and recording circuitry introduce a certain amount of phase distortion in the accumulation of the seismic data by the apparatus of FIG. 2. However, this distortion can be substantially reduced if the correlation pickup head 128 has a configuration identical to a sweep signal distorted by the instrumentation, and the head 128 is placed in a lagging relationship to the zero time pickup head 122 so as to automatically compensate for the phase lag induced in the sweep signal by the instrumentation.

The correlation pickup head 128 is electrically divided into a plurality of segments 128a, 128b, 128c, 128d and 128e by electrical taps. A plurality of isolation transformers 130a–130e are connected to the respective taps to isolate and reproduce the alternating current signals induced in the respective segments 128a–128e. The isolated signals are amplified by amplifiers 132a–132e, respectively, and are then passed through variable resistors 134a–134e, respectively. The sliding contacts of the variable resistors are connected through leads 136a–136e, respectively, to a multitrace oscilloscope 138. The sliding contacts of the variable resistors 134a–134e are also connected to a common conductor 140 by resistors 142a–142e. Conductor 140 is connected through a switch 144 to an amplifier 146 which is connected to a recording head 148 disposed in operative position adjacent the recording drum 108. Although only one recording head 148 is illustrated, a plurality of recording heads will usually be provided for separately recording the processed data originally recorded by a plurality of geophone arrays. In practice, the several recording heads would be alternately selected by a suitable selector switch (not illustrated).

The conductor 140 is also connected by a switch 150 to an integrator circuit 152 which may be substantially as shown in FIG. 4 and comprises a resistor 154 and capacitor 156. The output from the integrator circuit 152 is connected by a switch 158 to amplifier 146 and then to recording head 148 so that, if desired, an integrated signal may be recorded on the drum 108, as hereafter described in greater detail. The output from the integrator 152 is also connected to an adjustable output, linear amplifier 160 or other suitable linear circuit means which can be adjusted to vary the amplitude of the output, such as a variable resistor. The output from the amplifier 160 is fed to an exponential amplifier 162 having an output-to-input relationship substantially as illustrated by the curve 165 of FIG. 5. The output from the exponential amplifier 162 is fed to a second adjustable, linear amplifier 164 or other adjustable linear proportioning circuit means, and through a switch 166 to amplifier 146 and finally to the recording head 148. A second oscilloscope 168 is provided for visually monitoring the output from amplifier 164.

It will thus be seen that after the seismic data is recorded on record sheet 52 in the manner previously described, the record sheet is transferred to record drum 102 of the apparatus 100. Pickup head 114 simultaneously scans all of the record tracks 82 to produce one composite signal. At some time during the processing of one set of seismic data, the control sweep signal is also reproduced from the record track 54 by the head 110 and recorded on the correlation drum 106 by the recording head 112. As the correlation drum 106 continues to rotate, the signals magnetically recorded on the record tracks 112a and 116a pass under the pickup heads 122 and 128. As previously mentioned, the relative positions of the pickup heads 122 and 128 are preferably such as to compensate for any phase lag introduced by the reproduction, transmission and receiving of the control sweep signal, and by the geophones and the recording system of the apparatus shown in FIG. 2.

As the control signal recorded on the record track 112a of the correlation drum 106 passes under the pickup head 122, a single pulse is generated in the pickup head 122 and is recorded by the recording head 124 on the record track 126. After a short time interval, the composited signal recorded on the record track 116a of the correlation drum 106 begins to pass under the pickup head 128 and generate a correlation signal in the pickup head 128. The total signal generated in the pickup head 128 constitutes an impulse equivalent seismogram, as will hereafter be described in greater detail; however, since the earth tends to attenuate various portions of the frequency spectrum of the seismic signal as it travels through the earth, the correlation signal should be "normalized" to reshape the frequency spectrum to substantially equal amplitude.

The process of "normalization" is accomplished in the following manner. The total correlation signal generated in the pickup head 128 is split into the five separate component signals by the tapped segments 128a–128e and isolation transformers 130a–130e, respectively. The component signals are amplified by the amplifiers 132a–132e, fed to the variable resistors 134a–134e, and separately displayed by the multitrace oscilloscope 138. The sliding contacts of the several variable resistors 134a–134e are then adjusted until the relative amplitudes of the component signals are of equal or predetermined relative amplitudes in predetermined time zones of interest. In most cases the amplitude of the component signals will be adjusted to the same amplitude in a particular time zone of interest. However, where a velocity log from a well bore in the locality of the seismic data is available, the preferred method for normalizing the correlation signal is to convert the velocity log to an equal number of synthetic seismograms having band widths corresponding to the band widths of the component signals and then to adjust the amplitudes of the component signals to the same relative amplitudes. Once the relative amplitudes of the component signals are adjusted in the predetermined manner, the correlation signal as it appears at the common conductor 140 constitutes, for practical purposes, a seismogram which would be produced by (a) generating a single pulse having a predetermined, finite band width, substantially flat amplitude spectrum having zero phase relationship, and (b) recovering the seismic reflections from the impulse without suffering attenuation or phase distortion by the earth. Therefore, the signal applied to the conductor 140 can be represented by the function $S(t)$ in Equation 12.

If desired, the finite band width seismogram can be recorded without further processing merely by closing the switch 144. If the switch 150 is closed instead of the switch 144, the signal $S(t)$ is applied to the integrator circuit 152 to produce an integration signal $$\int_0^t S(t)\,dt$$

As will hereafter be be described in greater detail, the integration signal provides a very good approximation of an impedance log and is highly useful. If desired, the integration signal may be recorded on the drum 108 merely by closing the switch 158. If the switch 166 is closed instead of the switch 158, the integration signal $$\int_0^t S(t)\,dt$$

is multiplied by the factor A in the amplitude adjusting linear amplifier 160 to produce a signal corresponding to the function $$A\int_0^t S(t)\,dt$$

The amplitude adjusted signal from the amplifier 160 is then fed to the exponential amplifier 162 to produce a signal which can be described by the function $$e^{A\int_0^t S(t)\,dt} \qquad (18)$$

The signal (18) from the exponential amplifier 162 is applied to the amplifier 164 to produce a signal $$Z(0)_e A\int_0^t S(t)\,dt \qquad (19)$$

which passes through the switch 166 and amplifier 146 to the recording head 148.

The signal (19) from the amplifier 164 may be monitored by the oscilloscope 168. In most cases the changes in impedance will be the primary information sought so that establishment of the absolute impedance values need only be approximated. In any event, accurate determination of the absolute impedance values is limited to situations where very low frequencies can be induced in the earth, as will hereafter be described in greater detail.

Figure 6:
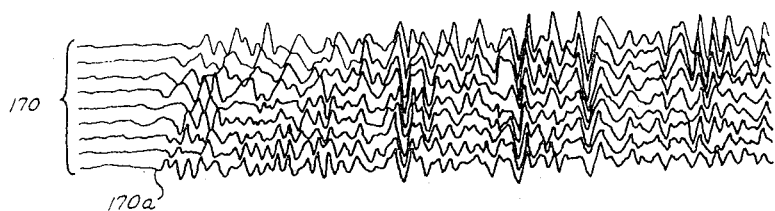
FIG. 6 is a reproduction of a plurality of composited and normalized seismic field records of a particular area.

Referring now to FIG. 6, nine separate composited, correlated and normalized seismic field traces are indicated collectively by the reference numeral 170. Each of the nine seismograms was produced in accordance with the above described method by using a seismic sweep signal of 6–65 c.p.s. Thus the traces 170 are the signals which appeared at the common conductor 140 (see FIG. 3).

Figure 8:
FIG. 8 is a reproduction of five identical synthetic seismographic traces compiled from the velocity log of FIG. 7.
Figure 7:
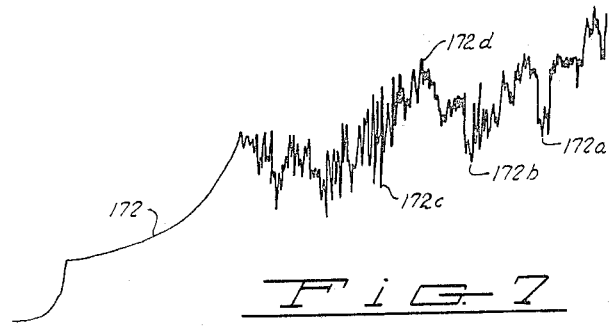
FIG. 7 is a reproduction of a velocity log from a well bore in the area where the seismic data of FIG. 6 was made.

Referring to FIG. 7, the trace 172 is a downhole velocity log from a well bore located in the same vicinity where the seismic data for the traces 170 was collected. Referring to FIG. 8, five identical synthetic traces indicated collectively by the reference numeral 174 are synthetic impulse seismograms produced by a digital computer from the velocity log trace 172. The procedure for producing the synthetic seismogram traces 174 is well known in the art and does not constitute a part of the present invention, the traces being used for comparison purposes as will presently be described. It is generally accepted in the art, however, that the synthetic seismogram traces 174 represent the theoretically optimum seismogram which can be obtained by using an impulse of seismic energy having a flat amplitude frequency spectrum of 6–65 c.p.s.

Figure 9:
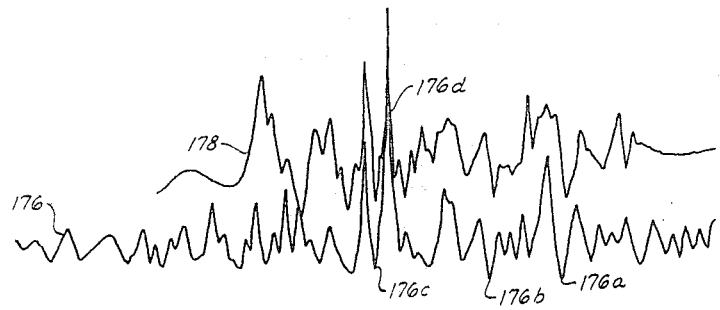
FIG. 9 is a reproduction of a pair of traces produced in accordance with the method of the present invention.

In FIG. 9, the lower trace 176 is an impedance log produced from the near trace 170a of FIG. 6 by integrating and exponentially amplifying the trace 170 as previously described. The upper trace 178 is provided for comparison and is produced by integrating and exponentially amplifying one of the identical synthetic seismogram traces 174. The correspondence between the traces 176 and 178 is readily evident. But even more importantly, the correspondence between the trace 176 and the velocity log trace 172 should be noted. For example, compare the points 176a with 172a, 176b with 172b, 176c with 172c and 176d with 172d. Thus it will be noted that there is substantially peak-to-peak correspondence between the velocity log trace 172 and the impedance trace 176.

ALTERNATE METHOD

A broad band seismic impulse signal is graphically illustrated in FIG. 10 as the impulse wavelet 180. The impulse wavelet has a frequency band width of 2–64 c.p.s. and each frequency in that band is equally represented. For example, a plot of the relative amplitudes of each of the frequencies would produce the graph 182 of FIG. 14. The impulse wavelet 180 is equal to the sum of all frequency components of equal amplitude between 2–64 c.p.s. with the frequency components phase oriented at a common point corresponding to the peak 180a of the trace 180.

It will be noted that the impulse wavelet 180 containing a relatively wide band of frequencies is very discrete and sharp. The fact that the low frequencies down to 2 c.p.s. are fully represented in the composite does not change this fact. Thus it will be appreciated that a particular band of frequency components of equal amplitude can be only as influential as its relative proportion of the total frequency spectrum involved. In other words, if the amplitude spectrum of an impulse signal from 2–64 c.p.s. is flat as in FIG. 14, the 2–4 c.p.s. octave will constitute only one thirty-second of the total band width and will play approximately the same small proportionate part in shaping the composite impulse wavelet. For example, referring to FIG. 11, it will be evident that the wavelet 184 from the 2–4 c.p.s. octave will have very little effect upon the total appearance of the wavelet 180. The successive octave wavelets 186, 188, 190 and 192 for the octaves 4–8 c.p.s., 8–16 c.p.s., 16–32 c.p.s. and 32–64 c.p.s., respectively, will obviously have increasingly greater effects upon the appearance of the total impulse wavelet 180.

Since it has long been accepted that equal spectral amplitude seismic energy is desirable, and because of the difficulties in generating and recording low frequencies, it has heretofore been the practice to disregard the low frequencies in the seismic energy because of the relatively small effect which the low frequencies play in the final seismogram, which fact is hereafter pointed out in greater detail in the discussion of FIG. 14. However, we have discovered that the lower frequencies are very important in the method of the present invention in order to approximate the absolute impedance values. This fact can best be explained by examining what takes place when a broad band seismic impulse engages any two successive spaced impedance interfaces. It will be noted that for any given interface spacing one particular frequency will be reinforced most as a result of the direct in-phase addition of the individual seismic reflections from the two spaced interfaces, which will normally be considered the top and bottom of a geological bed. This frequency may be considered as the "tuned" frequency. The frequencies immediately above and below the tuned frequency will be reinforced to some degree as long as there is general in-phase addition of the two reflections. Upon close investigation, it will be found that the total span of frequency reinforcement for any particular interface spacing will be on an octave basis rather than upon a cycles-of-band width basis. For example, if the basic frequency or tuned frequency to a particular interface spacing is 20 c.p.s., some in-phase addition will result in frequencies on either side of 20 c.p.s. so long as they are not a large part of an octave removed from 20 c.p.s. Of course it will be appreciated that some of the higher frequencies will also be tuned to the same beds, but as will hereafter become evident, these higher frequencies will be suppressed by the present method to such an extent as to be insignificant as an indicator of the particular interface spacing. Thus, for any given interface spacing, one frequency component indicator should be present in the seismic energy in order to detect the spacing. The indicator will, in general, comprise that band of frequencies whose wave lengths are such as to result in reinforcement.

In view of the discussion in regard to FIGS. 10 and 11, it is evident that if the amplitudes of the frequency representations in the octaves below the tuned or basic frequency are given equal amplitudes with the frequencies in the octaves above the tuned frequency, the tuned frequency for the particular interface spacing will not be properly represented. In order to produce a seismic impulse wavelet representative of the tuned frequency, it is necessary to give the octave below the tuned frequency the same spectral power as the octave above the tuned frequency. Since the octave below the tuned frequency has only half the band width as the octave above the tuned frequency, it is necessary to give the lower octave twice the amplitude of the upper octave.

The principle of equal representation by octaves is demonstrated in FIG. 12 which is a plot of relative amplitudes with respect to frequency. For example, if the tuned frequency of a particular bed or interface spacing is 16 c.p.s., the relative amplitude of the lower octave of 8–16 c.p.s. should be twice the amplitude of the octave from 16–32 c.p.s. in order for the total area under the curve for each octave to be equal. Thus it will be seen that the same relative relationship between the octaves below and above any particular tuned frequency should correspond to this principle. In order to satisfy this condition over the entire frequency spectrum, the amplitudes of the various frequency components of the seismic energy should correspond to the curve 194 of FIG. 13, which is in marked contrast to the amplitude curve of FIG. 14 for a so-called wide band, equal amplitude impulse. In FIG. 13 it will be noted that any octave will have exactly the same area under the curve 194 as any other related octave and therefore any particular octave is said to have equal spectral power with respect to any other related octave.

As previously shown there is a derivative relationship between reflectivity and the earth impedance; therefore, in order to orient all frequency components with respect to a common point in time it is necessary to correct for the accompanying phase shift. Fortunately, the slope of the curve 194 of FIG. 13 corresponds to the slope of a six decibel per octave integration filter which automatically inserts the proper 90° phase shift to accomplish the correction.

Figure 15:
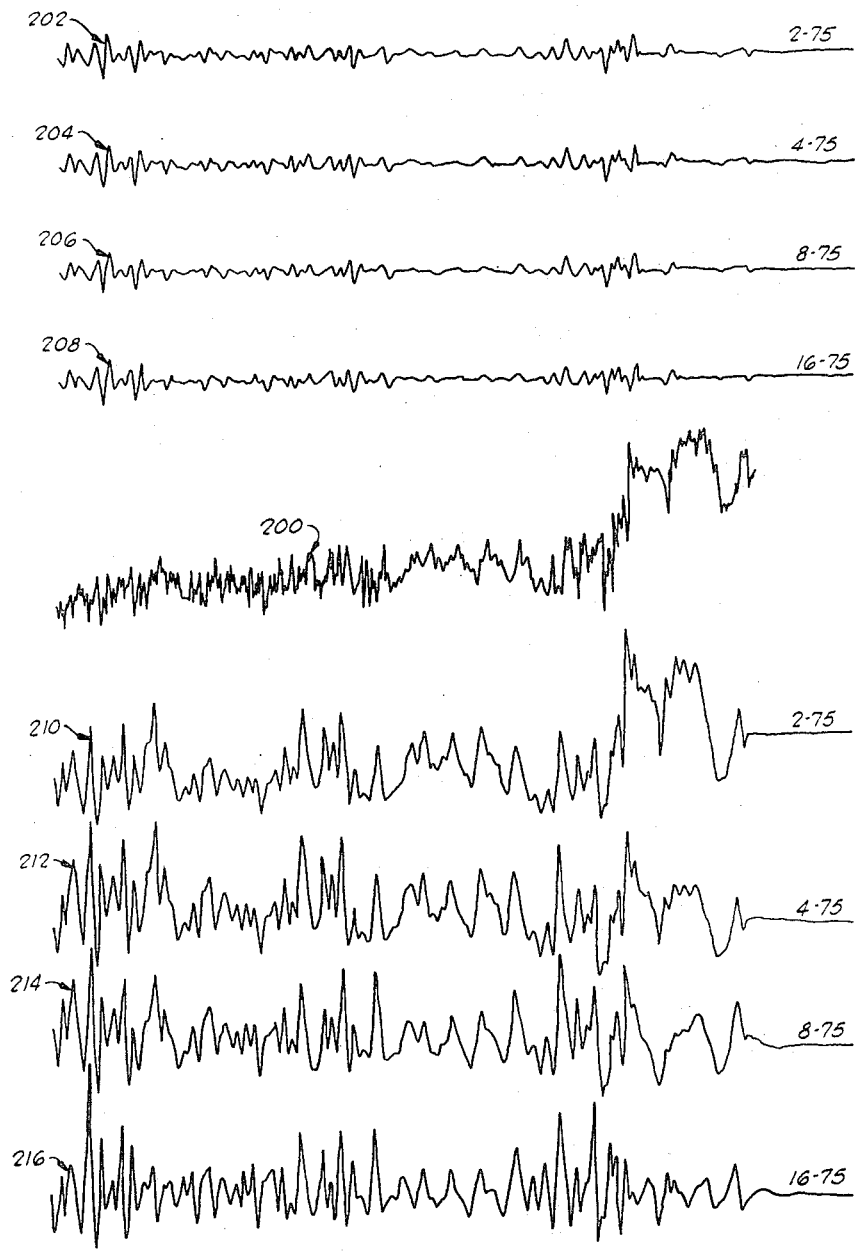
FIG. 15 is a collection of traces which serve to illustrate the importance of low frequency components in a seismic signal.

In order to demonstrate the difference between seismic data utilizing a flat amplitude spectrum and seismic data utilizing the phase corrected, equal representation by octave concept to produce an approximate impedance log, reference should now be made to FIG. 15. A downhole velocity log of a well bore is indicated by the reference numeral 200. A synthetic seismogram having a flat amplitude frequency spectrum of 2–75 c.p.s. as produced by a digital computer is indicated by the reference numeral 202. The traces 204, 206 and 208 are also synthetic seismograms but use frequency spectrums of 4–75 c.p.s., 8–75 c.p.s. and 16–75 c.p.s., respectively. The method for producing a synthetic trace from a velocity log by means of a digital computer is well known in the art and does not comprise a part of the present invention. The synthetic seismograms are reproduced merely for comparison purposes because the synthetic seismograms are generally accepted by workers in the art as the best possible data which can be obtained using conventional seismographic techniques. Thus the traces 202, 204, 206 and 208 represent the best possible data which would occur at the conductor 140 (FIG. 3) if seismic energy impulses having frequency spectrums of 2–75, 4–75, 8–75 and 16–75 c.p.s., respectively, were used to obtain the data. The traces 210, 212, 214 and 216 are approximate impedance logs obtained by passing the synthetic seismogram traces 202, 204, 206 and 208, respectively, through the integration filter 152 of the apparatus of FIG. 3.

First, it should be noted that the four seismogram traces are virtually indistinguishable from one another even though the upper trace 202 has a three octave greater band width than the lower trace 208. Further, the seismograms have very little exact correspondence with the velocity log from which they were deduced. On the other hand, it will be noted that the impedance log traces 210–216 have virtual peak-to-peak correspondence with the velocity log. In particular, it will be noted that the impedance log trace 210 which employs a frequency spectrum of 2–75 c.p.s. is substantially identical with the velocity log 200 and that the absolute values of the impedance log trace 210 very closely approximate the absolute values of the velocity log 200. However, as the lower cutoff point of the frequency spectrum is progresively raised one octave in the impedance log traces 212, 214 and 216, respectively, it will be noted that the absolute values of the impedance log traces become more removed from the absolute velocity values (which closely approximate impedance values) of the downhole velocity log 200 although the peak-to-peak correspondence remains. Thus it will be noted that the lower the frequency of the seismic signal induced in the earth, the more closely the seismic data compiled in accordance with the present invention can be expected to approach the true absolute impedance values.

Figure 16:
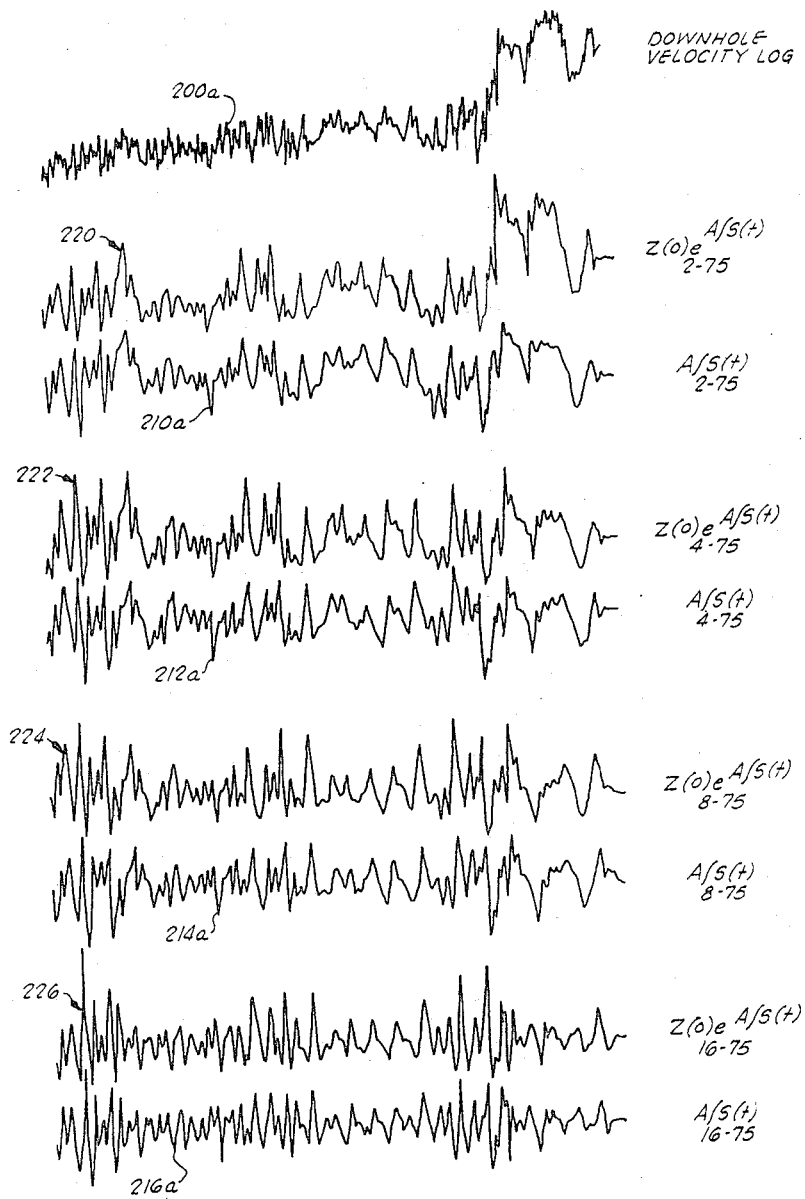
FIG. 16 is a collection of traces which demonstrate the degree of refinement which can be expected as a result of exponentially amplifying the integrated trace.

FIG. 16 is presented to demonstrate the degree of refinement which can be expected from the step of exponentially amplifying the integration signal. The downhole velocity log 200 of FIG. 15 is reproduced in FIG. 16 for comparison as trace 200a. Impedance trace 220 was made by passing the synthetic seismogram 202, having a frequency spectrum of 2–75 c.p.s., through both the integration and exponential amplification steps. Similarly, impedance traces 222, 224 and 226 were made by passing the synthetic seismograms 204, 206 and 208 through both the integration and exponential amplification steps. The four integration traces 210, 212, 214 and 216 of FIG. 15 are reproduced in FIG. 16 and designated 210a, 212a, 214a and 216a, respectively, for comparison. Therefore, it will be appreciated that the upper trace of each pair is merely the lower trace exponentially amplified. For example, the trace 220 is merely the exponential amplification of the trace 210a, both traces having been produced from the synthetic seismogram 202 which has a frequency spectrum of 2–75 c.p.s.

It will be noted that the exponentially amplified trace 226 is indistinguishable from the integrated trace 216a even though both of the traces have a spectrum of 16–75 c.p.s. Similarly, the exponentially amplified trace 224 is substantially identical to the integrated trace 214a. However, when the frequency spectrum is extended down to 4 c.p.s. a slight difference can be seen between the exponentially amplified trace 222 and the integrated trace 212a. And, when the lower end of the frequency spectrum extends down to 2 c.p.s., as in the case of the traces 220 and 210a, it will be noted that the absolute values of the exponentially amplified trace become slightly greater and the exponentially amplified trace tends to more nearly approximate the velocity log 200a. In other words, the exponential trace 220 has a more evident shift from a reference line as in the case of the velocity log. From this it can be deduced that the assumption previously made in deriving Equation 13 from Equation 12 is, as a practical matter, valid in all cases except where the seismic energy includes the very lowest frequencies, and as a practical matter, it is very difficult to generate sufficient energy below 4 c.p.s. to be useful. Therefore, except when extremely low frequencies are present in the seismic data, the integration step alone is sufficient for most practical uses.

It will be noted by referring to both FIGS. 15 and 16 that seismic energy below 16 c.p.s. is required before any distinguishable absolute value shift begins to occur in the impedance traces. For example, traces 216 (216a) and 226 include only 16–75 c.p.s. seismic energy and virtually no absolute value shift is detectable. However, when energy below 16 c.p.s. is included, as in the traces 214 (214a) and 224, the absolute values become more discernable. Seismic energy down to 4 c.p.s. produces even better results. Thus while workers in the art have heretofore generally disregarded seismic energy in the lower frequency range, we have discovered that these frequencies are essential in the production of practical and worthwhile impedance data using only seismic energy.

From the above detailed description of the various specific aspects of the present invention, it will be evident to those skilled in the art that a very novel and useful method has been disclosed for producing impedance data of a given locality using only seismic techniques. It is well recognized in the art that impedance data is probably the best method for describing the lithologic geometry of the earth. The impedance data permits the mapping of subsurface strata with a minimum of seismic data because of the ease and accuracy with which the various strata can be identified. Further, the impedance data provides information regarding the thickness and physical character of the various lithologic features.

Although a preferred method of the invention has been described in detail, it is to be understood that various changes, substitutions and alterations can be made in the specific steps described without departing from the spirit and scope of the invention as defined by the appended claims.

What is claimed is:
1. A method for determining the lithological geometry of the earth comprising the steps of:
   inducing seismic energy in the earth having a plurality of frequency components of predetermined amplitude and predetermined phase relationship;
   detecting the seismic energy reflections and recording the reflections with respect to time;
   establishing zero relative phase between the frequency components of the reflected seismic energy; and,
   establishing the relative amplitudes of the frequency components such that any two related octaves have substantially the same spectral power.
2. A method for determining the lithological geometry of the earth comprising the steps of:
   inducing seismic energy in the earth in the form of a plurality of sequentially produced frequency components in predetermined phase relationship;
   recording the seismic reflections with respect to elapsed time;
   orienting the sequentially produced frequency components with respect to a common point in time;
   shifting the phase of the frequency components to correct for the 90° phase shift induced by the seismic reflection process; and,
   establishing the relative amplitudes of the frequency components such that any two related octaves have substantially the same spectral power.
3. A method for determining the lithological geometry of a section of the earth comprising the steps of:
   producing a phase oriented, amplitude adjusted seismographic record signal of the section; and,
   converting the record signal to an impedance signal by approximating a solution to the equation:

$$\overline{Z}(t) = Z(0)_e A \int_0^t S(t) dt$$

where the record signal is $S(t)$, the impedance signal is $\overline{Z}(t)$, and $Z(0)$ and $A$ are scaling constants,
   whereby the impedance signal will approximate a seismic impedance log of the section of the earth.
4. A method for determining the lithological geometry of a section of the earth comprising the steps of:
   producing a phase oriented, frequency spectrum adjusted electrical signal representative of reflected seismic energy; and
   integrating the electrical signal to produce an impedance signal approximating a seismic impedance log of the section of the earth.
5. A method for determining the lithological geometry of a section of the earth comprising the steps of:
   producing a phase oriented, frequency spectrum adjusted electrical signal representative of reflected seismic energy;
   integrating the electrical signal to produce an integration signal; and,
   exponentially amplifying the integration signal to produce an impedance signal representative of the seismic impedance of the section of the earth.

6. A method for determining the lithological geometry of a section of the earth comprising the steps of:
inducing a non-repetitive seismic signal in the earth having a predetermined frequency and phase characteristic;
recording the seismic reflections of the signal with respect to travel time to produce a seismic record signal;
correlating the non-repetitive seismic signal with the seismic record signal to produce a correlated signal in which the various phases of the frequencies of the signal are oriented in a predetermined manner;
normalizing the correlated signal by adjusting predetermined frequency bands of the signal to predetermined relative amplitudes to compensate for attenuation of the frequencies by the earth to produce a normalized signal;
integrating the normalized signal to produce an integrated signal; and
passing the integrated signal through an exponential amplifier to produce a signal representative of the approximate seismic impedance of the earth through which the seismic signal traveled.

7. A method for determining the lithological geometry of a section of the earth comprising the steps of:
inducing a non-repetitive seismic signal in the earth having a predetermined frequency and phase characteristic;
recording the seismic reflections of the signal with respect to travel time to produce a seismic record signal;
correlating the non-repetitive seismic signal with the seismic record signal to produce a correlated signal in which the various phases of the frequencies of the signal are oriented in a predetermined manner;
normalizing the correlated signal by adjusting predetermined frequency bands of the signal to predetermined relative amplitudes to compensate for attenuation of the frequencies by the earth to produce a normalized signal;
passing the normalized signal through an integrator-exponential amplifier circuit having an input-to-output relationship corresponding to the relationship:

$$\overline{Z}(t) = Z(0) e^{A \int_0^t S(t) dt}$$

where $S(t)$ is the input signal, $\overline{Z}(t)$ is the output signal, and $Z(0)$ and $A$ are scaling constants to produce an impedance signal representative of the approximate seismic impedance of the section of the earth through which the seismic signal traveled.
where $S(t)$ is the input signal, $Z(t)$ is the output signal, and $Z(0)$ and $A$ are scaling constants to produce an impedance signal representative of the approximate seismic impedance of the section of the earth through which the seismic signal traveled.

8. A method for determining the lithological geometry of a section of the earth comprising the steps of:
inducing a non-repetitive seismic signal in the earth having a predetermined frequency and phase characteristic;
recording the seismic reflections of the signal with respect to travel time to produce a seismic record signal;
correlating the non-repetitive seismic signal with the seismic record signal to produce a correlated signal in which the various phases of the frequencies of the signal are oriented in a predetermined manner;
normalizing the correlated signal by adjusting predetermined frequency bands of the signal to predetermined relative amplitudes to compensate for attenuation of the frequencies by the earth to produce a spectrum balanced signal; and,
integrating the spectrum balanced signal to produce an approximate seismic impedance log with respect to travel time of the seismic signal through the earth.

9. A method for determining the lithological geometry of a section of the earth comprising the steps of:
inducing a seismic signal in the earth having a predetermined frequency spectrum of at least two octave band width, the lower end of which is less than 15 c.p.s.;
recording the seismic signal reflections from sub-surface impedance interfaces with respect to travel time to produce a record signal;
correlating the seismic signal with the record signal to produce a correlated signal in which the various frequencies of the seismic signal reflections are phase oriented with respect to a common time base;
normalizing the correlated signal by adjusting predetermined band widths to predetermined relative amplitudes to compensate for attenuation of the frequencies by the earth to produce a spectrum balanced signal having finite band width; and
integrating the spectrum balanced signal to produce an impedance signal representative of the approximate seismic impedance of the section of the earth through which the seismic signal traveled.

10. A method for determining the lithological geometry of a section of the earth comprising the steps of:
inducing a seismic signal in the earth having a predetermined frequency spectrum of at least two octave band width, the lower end of which is less than 15 c.p.s.;
recording the seismic signal reflections from subsurface impedance interfaces with respect to travel time to produce a record signal;
correlating the seismic signal with the record signal to produce a correlated signal in which the various frequencies of the seismic signal reflections are phase oriented with respect to a common time base;
normalizing the correlated signal by adjusting predetermined band widths to predetermined relative amplitudes to compensate for attenuation of the frequencies by the earth to produce a normalized signal;
integrating the normalized signal to produce an integration signal; and,
exponentially amplifying the integration signal to produce a signal approximating a seismic impedance log of the section of earth.

11. An improved method for determining the lithological geometry of a section of the earth comprising the steps of:
inducing a seismic sweep signal in the earth having a predetermined number of frequency components in predetermined phase relationship to form a frequency spectrum of at least two octaves band width having a lower cutoff point of less than 15 c.p.s.;
recording the seismic signal reflections from subsurface impedance interfaces with respect to travel time to produce a record signal;
correlating the sweep signal with the record signal to produce a correlated signal in which the various frequency components of the seismic sweep signal of each reflection are phase oriented with respect to a common point in time;
normalizing the correlated signal by adjusting predetermined octave band widths to predetermined relative amplitudes to compensate for attenuation of the frequency components by the earth to produce a spectrum balanced signal; and,
integrating the spectrum balanced signal with respect to time from a datum time to produce a signal representative of the approximate seismic impedance with respect to depth of the section of the earth.

12. A method for converting a spectrum balanced, finite band width impulse seismogram into a trace approximating an impedance log comprising the steps of:
- producing an electrical signal representative of the spectrum balanced, finite band width impulse seismogram;
- passing the electrical signal through an integrator circuit to produce an impedance signal; and,
- recording the impedance signal to produce an approximate impedance log.

13. A method for converting a spectrum balanced, finite band width impulse seismogram into a trace approximating an impedance log comprising the steps of:
- producing an electrical signal representative of the spectrum balanced, finite band width impulse seismogram;
- passing the electrical signal through an integrator circuit to produce an integrated signal;
- passing the integrated signal through an exponential amplifier circuit to produce an impedance signal; and,
- recording the impedance signal to produce an approximate impedance log.

References Cited by the Examiner

UNITED STATES PATENTS

| | | | |
|---|---|---|---|
| 2,688,124 | 8/1954 | Doty et al. | 340—15.5 |
| 3,011,582 | 12/1961 | Peterson | 181—.5 |
| 3,076,177 | 1/1963 | Lawrence et al. | 340—15.5 |
| 3,108,249 | 10/1963 | Clement | 340—15.5 |
| 3,142,815 | 7/1964 | Picou | 340—15.5 |
| 3,180,445 | 4/1965 | Schwartz et al. | 340—15.5 |

BENJAMIN A. BORCHELT, *Primary Examiner.*

R. M. SKOLNIK, *Assistant Examiner.*